(12) United States Patent　　(10) Patent No.: US 7,729,887 B2
Sherrill et al.　　(45) Date of Patent: Jun. 1, 2010

(54) SYSTEM MANAGEMENT USER INTERFACE PROVIDING USER ACCESS TO STATUS INFORMATION FOR PROCESS CONTROL SYSTEM EQUIPMENT INCLUDING A STATUS MONITOR

(75) Inventors: Thomas Dean Sherrill, Upton, MA (US); Maria Dao Nguyen, Mansfield, MA (US); Donald James Wayland, Jr., Attleboro, MA (US); Kristen L. Garrison, New Bedford, MA (US); Brian James Barry, Cumberland, RI (US); Naredla Maharaj Kumar Murty, South Grafton, MA (US)

(73) Assignee: Invensys Systems, Inc., Foxboro, MA (US)

( * ) Notice: Subject to any disclaimer, the term of this patent is extended or adjusted under 35 U.S.C. 154(b) by 705 days.

(21) Appl. No.: 11/403,220

(22) Filed: Apr. 11, 2006

(65) Prior Publication Data

US 2007/0240052 A1　　Oct. 11, 2007

(51) Int. Cl.
*G06F 3/01* (2006.01)
*G06F 17/00* (2006.01)

(52) U.S. Cl. .................. 702/188; 702/183; 715/734; 715/736

(58) Field of Classification Search .............. 702/188, 702/183, 185
See application file for complete search history.

(56) References Cited

U.S. PATENT DOCUMENTS

| | | | | |
|---|---|---|---|---|
| 5,506,787 A | * | 4/1996 | Muhlfeld et al. | 700/181 |
| 7,310,774 B1 | * | 12/2007 | Arquie et al. | 715/734 |
| 7,315,985 B1 | * | 1/2008 | Gauvin et al. | 715/734 |
| 2002/0199132 A1 | * | 12/2002 | Lachimia et al. | 714/14 |
| 2003/0028269 A1 | * | 2/2003 | Spriggs et al. | 700/83 |
| 2004/0221245 A1 | * | 11/2004 | Chickles et al. | 715/854 |
| 2005/0012396 A1 | * | 1/2005 | Chidambaram et al. | 307/77 |
| 2006/0161313 A1 | * | 7/2006 | Rogers et al. | 701/1 |
| 2006/0282796 A1 | * | 12/2006 | Nuno et al. | 715/853 |
| 2007/0078628 A1 | * | 4/2007 | Virji et al. | 702/183 |

* cited by examiner

*Primary Examiner*—Hal D Wachsman
(74) *Attorney, Agent, or Firm*—Leydig, Voit & Mayer Ltd.

(57) ABSTRACT

A system management human-machine interface application for use in a process control system is described herein that enables users to view/monitor information regarding system status and performance and to initiate changes to the operation of system equipment, checkpoint control stations and execute diagnostics. A system management graphical user interface includes a number of features that address the accessibility of system status information to users. Such features include rendering selectable diagnostic information (e.g., online/offline status) on a system component navigation view. The GUI also provides access to a variety of system information including: alarms, messages, watched system management parameters, and a legend for symbols displayed in a system management navigation tree. Other features include: a search function for locating a device in the system to render detailed information, a navigation tree that displays equipment status via icons, and propagating fault statuses up to a highest level of the navigation tree.

20 Claims, 8 Drawing Sheets

| General | Connections | Counters | | | |
|---|---|---|---|---|---|

Counter Categories — 302

○ MAC Sublayer  ○ Transport Layer  ○ Application Layer  ○ Loading Parameters

| Counter | Current Value | Previous Value | Maximum | Minimum |
|---|---|---|---|---|
| 802.3 MAC Resets | 2 | | 2 | 2 |
| 802.4 MAC Resets | 0 | | 0 | 0 |
| Align Errors | 0 | | 0 | 0 |
| Collisions | 0 | | 0 | 0 |
| CRC Errors | 0 | | 0 | 0 |
| DMA Overrun | 0 | | 0 | 0 |
| DMA Underruns | 0 | | 0 | 0 |
| Excess Collisions | 0 | | 0 | 0 |
| Frames Received | 9032 | | 9032 | 9032 |
| Frames Transmitted | 9347 | | 9347 | 9347 |
| No Receive Resources | 0 | | 0 | 0 |
| Transmits Deferred | 0 | | 0 | 0 |

400

310

| Messages | Alarms | Inhibited | Search | Watch | Smon Log |
|---|---|---|---|---|---|

| Counter | Current Value | Previous Value | Maximum | Minimum | Source |
|---|---|---|---|---|---|
| Frames Received | 43597 | | 43597 | 43597 | ZCP703 |
| Frames Transmitted | 45502 | | 45502 | 45502 | ZCP703 |
| Frames Received | 9032 | | 9032 | 9032 | FCP701 |
| Frames Transmitted | 9347 | | 9347 | 9347 | FCP701 |

Fig. 4

| Name | Type | Status | Run Mode/Communications | Device/Failed State |
|---|---|---|---|---|
| ZCP703 | FBM 0 | Warning Unacknowledged | On Line | Not Failed |
| FCM300 | FCM100ET | Off Line | A Off Line / B Off Line | A Not Failed / B Not |
| FCM303 | FBM 202 | Off Line | Off Line | Out of Service |
| FCM304 | FBM 203 | Off Line | Off Line | Out of Service |
| FCM305 | FBM 205 | Off Line | Off Line | Out of Service |
| FCM307 | FBM 212 | Off Line | Off Line | Out of Service |
| FCM308 | FBM 214 | Off Line Inhibited | Off Line | Not Failed |
| FCM311 | FBM 215 | Off Line Inhibited | Off Line | Not Failed |
| FCM312 | FBM 219 | Off Line | Off Line | Out of Service |
| FCM315 | FBM 220 | Off Line | Off Line | Not Failed |
| FCM316 | FBM 243 | Off Line | Off Line | Out of Service |
| FCM317 | FBM 223 | Off Line | Off Line | Not Failed |
| FCM318 | FBM 237 | Off Line | Off Line | Out of Service |

Fig. 5

| Messages | Alarms | Inhibited | Search | Watch | Smon Log |
|---|---|---|---|---|---|

| | | | Search Results - 3 | Type: | Path |
|---|---|---|---|---|---|
| Category: | Control Processor | ⌄ | ⚠ 🖳² ZCP703 | ZCP270 | SYSMN1\ZCP703 |
| Type: | ZCP270 | ⌄ | ⊘ 🖳² ZCP704 | ZCP270 | SYSMN1\ZCP704 |
| Name: | | ⌄ | ⚠ 🖳 ZCP706 | ZCP270 | SYSMN1\ZCP706 |
| SMON: | | ⌄ | | | |
| Switch: | | ⌄ | | | |
| Boot Host | | ⌄ | | | |
| FT State | All | ⌄ | | | |
| | Search | Stop | | | |

FIG. 8

SYSTEM MANAGEMENT USER INTERFACE PROVIDING USER ACCESS TO STATUS INFORMATION FOR PROCESS CONTROL SYSTEM EQUIPMENT INCLUDING A STATUS MONITOR

This application relates to Sherrill et al., U.S. patent application Ser. No. 11/402,645 (pending), filed on Apr. 11, 2006, entitled "SYSTEM MANAGEMENT USER INTERFACE PROVIDING USER ACCESS TO STATUS INFORMATION FOR PROCESS CONTROL SYSTEM EQUIPMENT," the contents of which are expressly incorporated herein by reference in their entirety, including any references therein.

This application relates to Sherrill et al., U.S. patent application Ser. No. 11/403,223 (pending), filed on Apr. 11, 2006, entitled "SYSTEM MANAGEMENT USER INTERFACE PROVIDING USER ACCESS TO STATUS INFORMATION FOR PROCESS CONTROL SYSTEM EQUIPMENT INCLUDING A SEARCH FUNCTION," the contents of which are expressly incorporated herein by reference in their entirety, including any references therein.

This application relates to Sherrill et al., U.S. patent application Ser. No. 11/402,633 (pending), filed on Apr. 11, 2006, entitled "SYSTEM MANAGEMENT USER INTERFACE PROVIDING USER ACCESS TO STATUS INFORMATION FOR PROCESS CONTROL SYSTEM EQUIPMENT INCLUDING DISPLAYED PROPAGATED STATUS IN A NAVIGATION PANE," the contents of which are expressly incorporated herein by reference in their entirety, including any references therein.

FIELD OF THE INVENTION

The present invention generally relates to the field of computerized control systems. More particularly, the invention concerns application programs including graphical human-machine interfaces for monitoring the status of and/or exercising supervisory control over equipment used to monitor and/or control processes. Such interfaces often provide multiple screens tied to data representing the status of the control components (both hardware and software) including control processors, gateways, switches, workstations, I/O modules, data access servers, etc.

BACKGROUND

Industry increasingly depends upon highly automated data acquisition and control systems to ensure that industrial processes/operations run efficiently, safely and reliably while lowering overall costs. In such systems, data acquisition begins with sensors measuring current values/status of process variables representing the status/operation of an industrial process or operation. The measurements are communicated to programmed controllers and data collection/management systems. The data collection/management systems, generally including process databases and data processing routines, manage and maintain the measurement data. Such data management and maintenance includes further processing the data (e.g., filtering), storing the data, and distributing the data to a variety of client applications. Such client applications include both automated and manual supervisory control processes and display/monitor user interfaces.

Industrial process/operation measurements come in a wide variety of forms and are used by industrial process control systems to regulate a variety of operations, both with respect to continuous and discrete manufacturing processes. By way of example the measurements produced by sensors include: a temperature, a pressure, a pH, a mass/volume flow of material, a quantity of bottles filled per hour, a tallied inventory of packages waiting in a shipping line, or a photograph of a room in a factory. Often, sophisticated automated process management and control hardware/software examine acquired process/operation measurement data, and respond by sending messages/signals to actuators/controllers that adjust the operation of at least a portion of the industrial process. The data produced by the sensors is also provided to human-machine interface (HMI) applications. The HMI applications support a variety of views that enable an operator to perform a number of supervisory tasks including: tailor the process (e.g., specify new set points) in response to varying external conditions (including costs of raw materials), detect an inefficient/non-optimal operating condition and/or impending equipment failure (alarm), and take remedial actions such as shut down a process or move equipment into and out of service as required.

System management application components execute in a supervisory role in process control systems to monitor operational status and overall health of the portions of a process control system that are responsible for acquiring process status information and applying decisions to the devices that control the processes. The system management components are basically responsible for monitoring and controlling the equipment/devices that control the process itself. In this role, the system management application components receive a variety of status data regarding the health and performance of process control system equipment including, for example: control processors, network switches, fieldbus modules, field devices connected to a process control network. The system management application components are also capable of taking actions, based upon the equipment status information, to alter the operation of system equipment. Such actions include: inhibiting/enabling alarms, checkpointing, rebooting, enabling/disabling upload, enabling/disabling download, enabling/disabling reports, going online/offline, running diagnostics, calibrating, Vast quantities of various types of information are received by the system management application components. Some of the information is received and acted upon automatically by programmed system management components without user intervention/knowledge. However, other information is acquired and organized for display by a user interface subsystem on a graphical user interface (GUI) at a monitor station. Generally, increasing the types of information that can be presented to a human user improves the ability of the user to make decisions regarding the operation of the process control system equipment. However, when very large quantities of information of many types are involved, such information diminishes in value as the information becomes less accessible. It is therefore desirable to present system management information via a user interface in a manner that enhances its ability to be located and understood by users.

SUMMARY OF THE INVENTION

In accordance with the present invention, a system management HMI application is provided that includes a multi-paned interface. A navigation pane includes a hierarchical tree including nodes corresponding to control system equipment. A component-specific information pane provides detailed information corresponding to a selected node on the navigation pane. The detailed information includes diagnostic information. Furthermore, the hierarchical tree is supplemented to provide a variety of status indicators (e.g., icons)

visually depicting a status of an associated piece of equipment represented by the node in the hierarchical navigation tree. In accordance with an exemplary embodiment a combination of unique symbols are combined with colors and animation to uniquely and actively prompt a human response to active faults.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION

A system management human-machine interface (HMI) application for use in process control systems is described herein that enables users to view/monitor information regarding system status and performance and to initiate changes to the operation of system equipment (e.g., controllers, fieldbus modules, etc.), checkpoint control stations and execute diagnostics. One aspect of the system management application comprises a system management graphical user interface (GUI) that includes a number of interface features that enhance the accessibility of system status information to users. Such enhancements include rendering selectable diagnostic information (e.g., online/offline status) on a system component navigation view. The GUI also provides access to a variety of system information including: alarms, messages, watched system management parameters, and a legend for symbols displayed in a system management navigation tree.

The system management application also includes a search functionality that links a listing of system search results to associated information. Tying the listed results to information structures associated with the identified system components allows a user to navigate automatically to a system component and open its information by selecting the system component from a set of system component search results.

The system management application also includes a navigation tree wherein the status of system components represented in the navigation tree is reflected in one or more visual traits (e.g., text, color, icons).

Yet another aspect of the user interface that enhances a user's overall experience is an enhanced diagnostics feature incorporated within a navigation tree view wherein status information is propagated up a hierarchically arranged set of ancestor nodes on the navigation tree. Thus, an alarm originating from a currently hidden node is visually depicted within the tree. A user thereafter opens the ancestor nodes to reach the system node from which the alarm originates.

Each of the aforementioned enhancements to the system management HMI application is described in detail herein below with reference to the figures.

Figure 1:
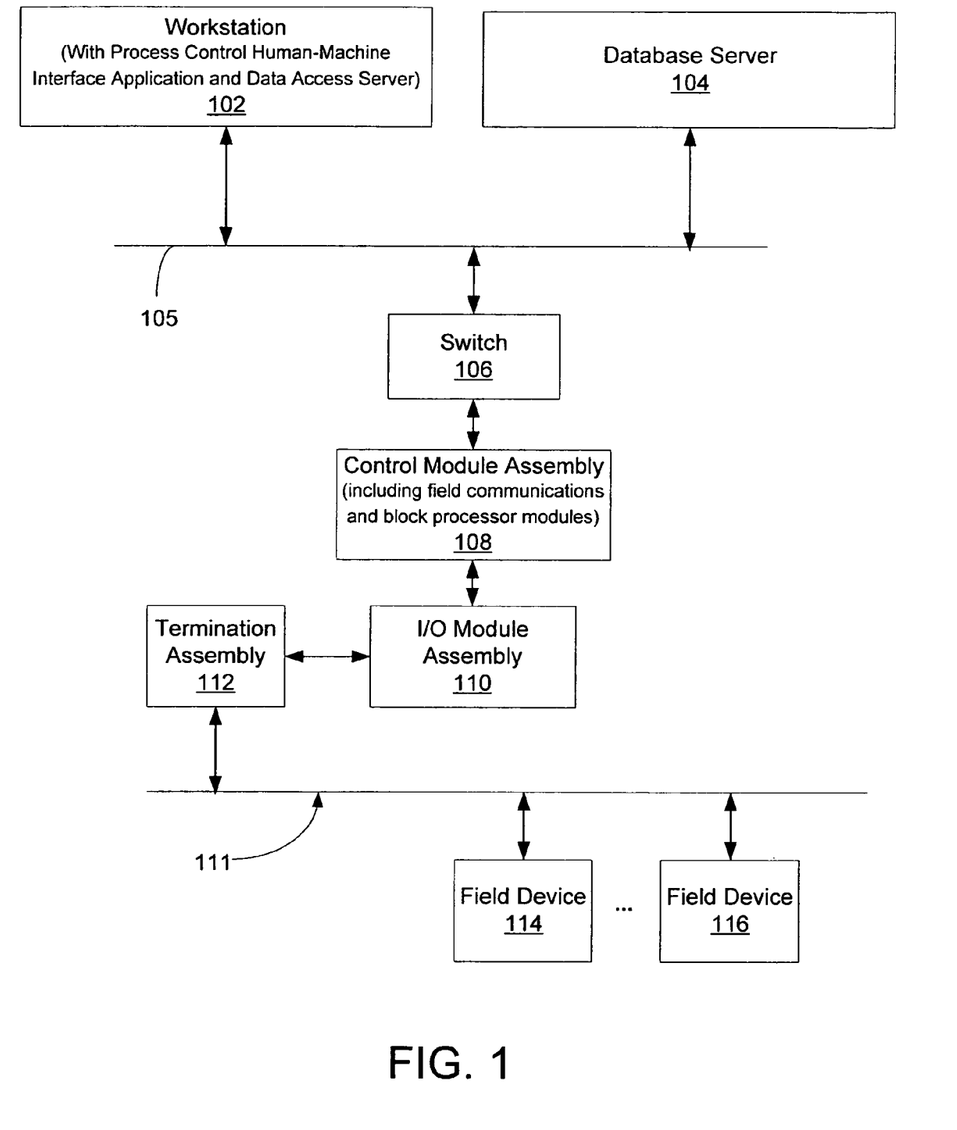
FIG. 1 is schematic network diagram showing an exemplary control environment comprising both a control network and an application/supervisory network suitable for carrying out an embodiment of the present invention.

Before, describing the system management HMI application embodying the present invention, an exemplary process control network environment/facility is briefly described. The present invention is potentially incorporated in a variety of process control facility arrangements, and other physical process control arrangements will be known to those skilled in the art in view of the disclosure contained herein. Turning to FIG. 1, an exemplary simple process control system arrangement/environment is depicted wherein an exemplary system management HMI application operates to provide user access to information representing the status of process control equipment for a controlled plant/process. A workstation 102, comprising the system management HMI application provides access to a wide variety of information associated with a process control system. Such information originates, for example, from control processors, network switches, fieldbus modules, and field devices.

The workstation 102 comprises any of a variety of hardware/operating system platforms. For example, the workstation 102 comprises a personal computer running any of a variety of operating systems such as: Microsoft Windows XP, Unix, Solaris, etc.

In an illustrative embodiment, the system management HMI application requires fresh information. To avoid delays due to retrieval from less direct data sources, the workstation 102 receives both process and equipment/system data directly from a control module assembly 108 described further herein below. The system management HMI application presents a set of views of information concerning process control system equipment that implement automated decision making and exercise control over a controlled process.

In the illustrative example, the workstation 102 is connected via an Ethernet interface/wiring to an Ethernet switch 106 via a network link 105. A database server 104 is connected to the network link 105. Alternatively, a redundant mesh network provides a communicative path between workstations, database servers, and the switch 106. The Ethernet switch 106 can be any of a variety of commercially available switches. By way of example the Ethernet switch 106 is one provided, for example, by Allied Telesyn (e.g., model AT-8088/MT). While not specifically depicted in FIG. 1, additional nodes, comprising workstations, servers and other elements (e.g., high level control module assemblies) of a supervisory portion of the control system are potentially connected to the switch 106.

The switch 106, and potentially other non-depicted switches, is also communicatively coupled to the control module assembly 108. The control module assembly 108 comprises one or more control modules (also referred to as control processors) that execute control programs driven by process sensor data values and render output values to devices (e.g., valves, motors, etc.) controlling a plant process. An illustrative example of such control module is a FOXBORO CP model FCP270, by Invensys Systems, Inc. In other embodiments, process control functionality is carried out in any of a variety of control modules—even by control programs incorporated into the workstations, intelligent transmitters, or virtually any communicatively coupled device capable of executing control programs, loops, scripts, etc.

In an embodiment where the control module assembly 108 is the FOXBORO FCP270, workload is divided, within the FCP270, between controlling data communications and executing control programs (blocks). The FCP270 processes data received from an I/O module assembly 110 in parallel using the two distinct hardware modules—a block processor module and a field communications module. The block processor module periodically executes control programs, according to a user configurable processing cycle period (e.g., 100 ms). The output values of the control programs executed within the block processor module are driven by process data received by the control module assembly 108 from the I/O module assembly 110. The I/O module assembly 110 comprises, by way of example, INVENSYS FBM207 and/or FBM217 fieldbus modules that pass digital input values to the control module assembly 108.

With regard to the above-mentioned data communications task carried out by the control module assembly 108, in the illustrative example the field communications module within the FCP270 receives data from the I/O module assembly 110. The received data is passed to both the above-mentioned block processor module (within the control module assembly 108) and to process data subscribers according to an appropriate network communication protocol (e.g., TCP/IP) via the network link 105. The protocols/mechanisms used to provide data to various subscribers varies in accordance with particular embodiments of the invention.

With continued reference to FIG. 1, the I/O module assembly 110, alternatively referred to as a field bus module (FBM), is communicatively coupled to the control module assembly 108. Communications protocols utilized for carrying out communications between the I/O module assembly 110 and control module assembly 108 are potentially any one of a variety of proprietary/non-proprietary communications protocols. In one embodiment, the digital data communications between the control module assembly 108 and I/O module assembly 110 are carried out via a 2 MBit HDLC communication protocol. While only a single I/O module assembly 110 is depicted in the illustrative example, control systems embodying the present invention potentially comprise many I/O module assemblies.

I/O module assemblies, in general, incorporate one or more of a variety of specialized interfaces for communicating directly and/or indirectly to a variety of device types, including sensors/actuators embodying particular communications protocols, located at distributed locations in a plant. In the illustrative example, the I/O module assembly 110 comprises a Foundation Fieldbus I/O module (e.g., an Invensys field bus module model FBM228) that supports communications between the control module assembly 108 and field devices coupled to a Foundation Fieldbus network 111. In the illustrative embodiment, a set of representative intelligent field devices 114 and 116, containing multiple application-dependent configurable parameters, are connected to the Foundation Fieldbus network 111. The field devices 114 and 116 operate at the lowest level of a control system to measure (transmitters) and control (positioners, motor switches, etc.) plant activity. A termination assembly 112 communicatively couples the I/O module assembly 110 to the field devices 114 and 116. The termination assembly 112 provides power and power conditioning to the extent needed by the field devices 114 and 116 on the network 111.

Figure 2:
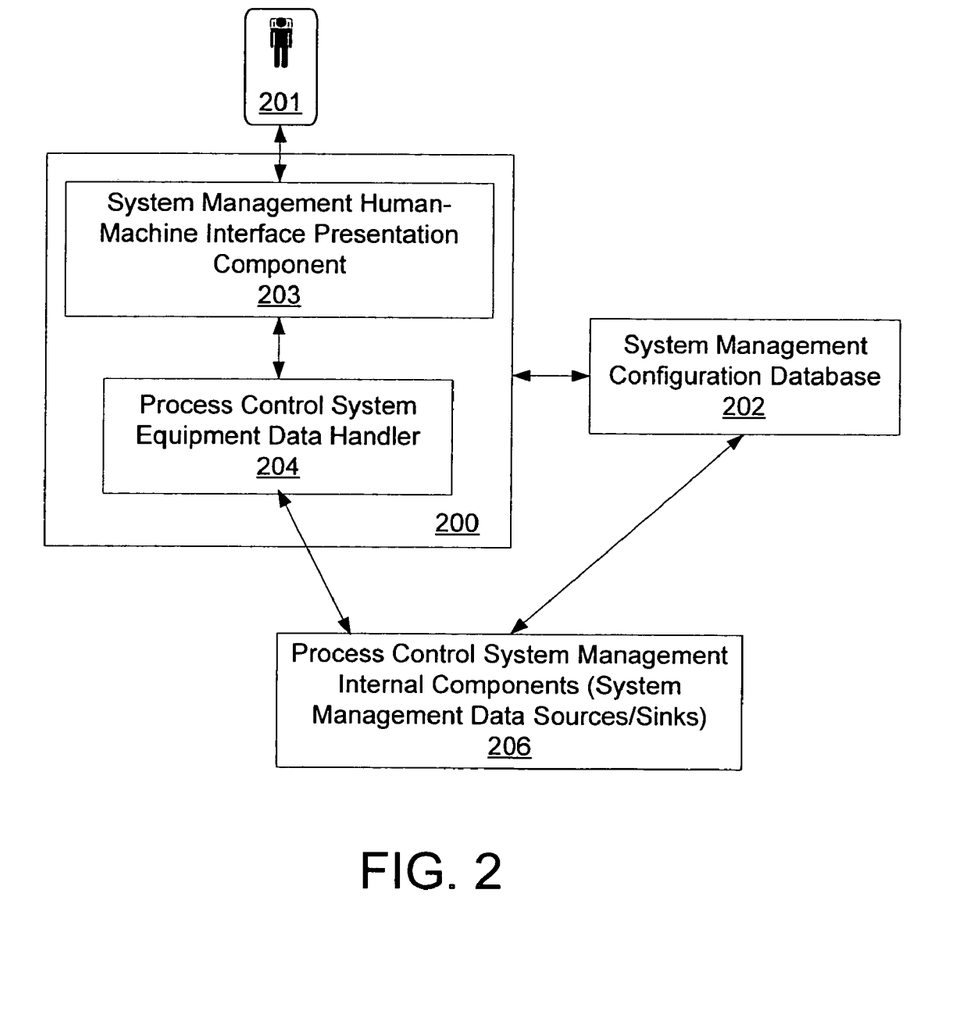
FIG. 2 is a schematic diagram of a system management HMI application and associated components that execute on a workstation node communicatively coupled to one or more process control system status data sources that supply system status data to the workstation and receive commands from the system management HMI application.

Having described an exemplary network environment within which a system management HMI application 200 embodying the present invention is potentially incorporated, attention is directed to FIG. 2 that depicts an exemplary set of components associated with the system management HMI application 200 and their general relationships which facilitate interactions between the HMI application 200 and a human user 201 via an HMI presentation component 203.

A system management configuration database 202 includes identifications and addresses of data sources and sinks utilized by the system management HMI application 200. The information within the system management configuration database 202 includes indicators of the types of equipment data and their relationships (i.e., their hierarchical links) that drive corresponding user interface displays rendered by the system management HMI presentation component 203.

The System management HMI application 200 receives updates for connected process control system equipment parameters through a process control system equipment data handler 204. The handler 204, in turn, communicates via inter-process communications (e.g., request/response pairs and unsolicited alarm messages) with internal components 206 which are the sources/recipients of data/commands from the HMI application 200. The internal components 206, in turn, communicate with control system equipment to receive status information and implement commands initiated by the user 201 via the HMI application 200.

Parent-child relationships specified between elements of a process control system management tree defined within the database 202 facilitates propagating alarms from most specific levels up to the top of a node tree representing the equipment whose status is monitored and/or controlled by a user via the HMI application 200. When an alarm associated with a particular piece of managed process control equipment/device is set (e.g., a fieldbus module or field device is in a "fault state"), the particular node in the management tree associated with that process control equipment is set to an alarm state, resulting in a display state change of at least one displayed node on the tree as a result of an alarm propagation function carried out by the HMI application 200 that is described further herein below. Thus, if the node associated with a particular piece of equipment in alarm is presently not displayed, then one of its displayed ancestors changes to an alarm display state. Thereafter, the user 201 drills down to one or more hierarchical tree levels until the source of the alarm is exposed for selection by the user 201.

The system management HMI application 200 GUI supports the same general equipment information presentation and equipment administration action capabilities as those present in the I/A SERIES SYSTEM MANAGEMENT DISPLAY HANDLER. The system management HMI application 200 GUI supports viewing the health and performance of equipment including, for example: network switches, FBMs, field devices, integrated devices, and performance counters in a station. The HMI application 200 GUI supports acknowledging alarms associated with equipment. The system management HMI application 200 GUI supports submitting change actions/commands to equipment including, for example, issuing commands for: inhibiting/enabling alarms, checkpointing, rebooting, updating an EEPROM, enabling/disabling upload/download, and enabling/disabling reports. In the case of equipment control blocks (ECB's) and fieldbus communication modules (FCMs) the system management HMI application 200 GUI supports submitting commands, by way of example, for: updating an EEPROM, going online/ offline, enabling/disabling switching buses, enabling/inhibiting device alarming, switching roles. The HMI application 200 GUI also supports offline diagnostics for stations (based on station type) and ECB's. Furthermore, the HMI application 200 GUI supports calibrating intelligent field devices.

Figure 3:
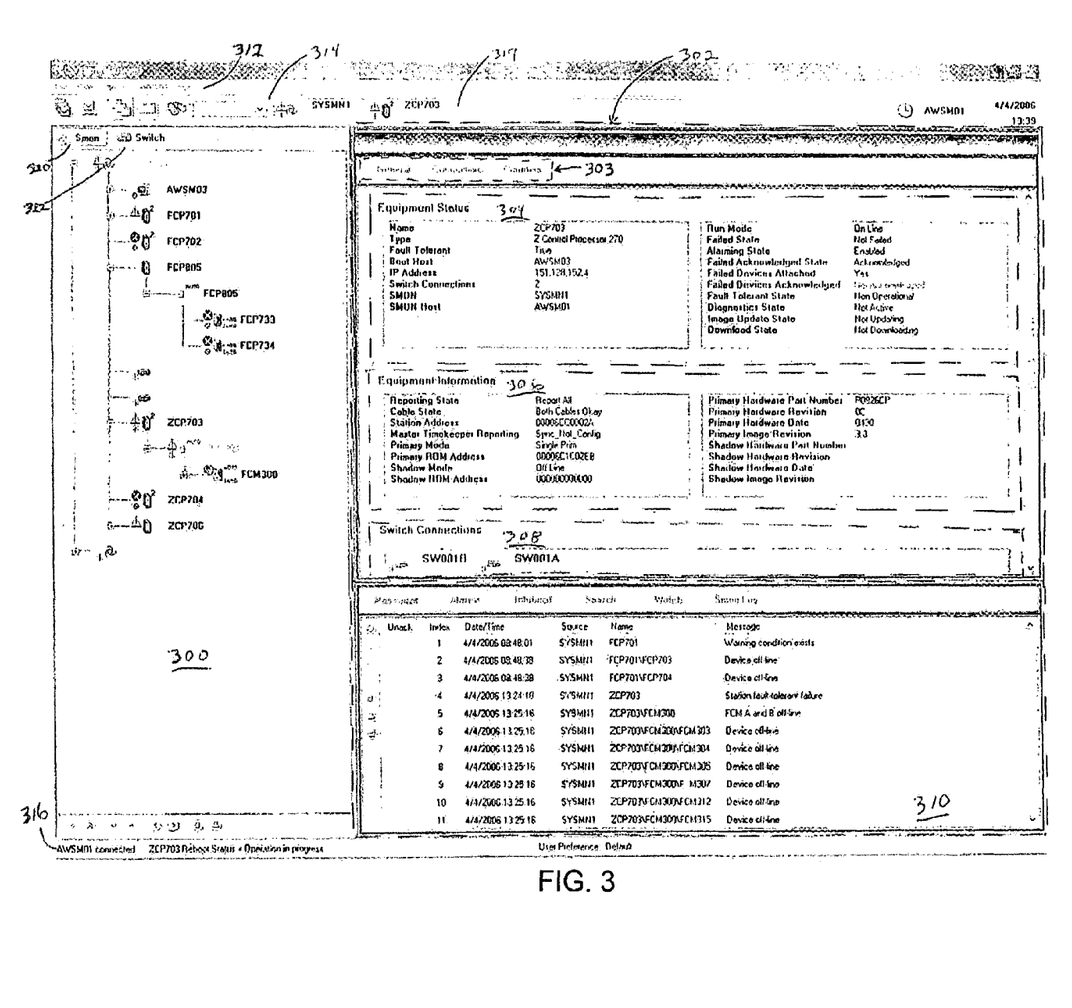
FIG. 3 is an exemplary system management HMI application display.

Turning to FIG. 3, an exemplary user interface is depicted that shows the various user interface elements/functions supported by a graphical user interface providing enhanced data access and navigation capabilities for use in the system management HMI application 200. The exemplary GUI comprises a navigation pane 300 that presents a hierarchical tree view to browse process control system equipment information and indicate status through combined use of icons, text, colors, and visual effects (e.g., flashing). An enlarged view of a similar tree is provided in FIG. 7 to more clearly depict status icons that are presented alongside component nodes to identify present status.

The GUI also includes a component-specific information area 302 that is used to display a variety of general and specific information corresponding to a selected node displayed in the navigation pane 300. In an illustrative embodiment the component-specific information is organized into "General Information", "Connections", and "Counters" groups that are accessed by selecting one of the three correspondingly labeled controls 303 (e.g., buttons, tabs, etc.). The set of groups differs in alternative embodiments. For example, another potential group comprises a set of diagnostics related information providing access to a set of component parameters relating to offline diagnostics. In addition to presenting current status/configuration information, the information area 302 supports user submission of new configuration information by selecting any write-enabled field and entering a new value for a parameter. Upon confirmation, the HMI application 200 transmits the changed data to an appropriate piece of equipment via the data handlers 204.

In the illustrative example set forth in FIG. 3, the component-specific information displayed in the information area 302 corresponds to information rendered in response to a user selecting the "General Information" control in the set of controls 303. The general information display mode comprises detailed status and configuration information for a currently selected equipment node depicted in the navigation pane 300. In the illustrative embodiment the general information for a selected component is divided into sub-groups that are displayed within an Equipment Status pane 304, an Equipment Configuration pane 306, and a Switch Connections pane 308. It is noted that the types of information and the groupings of parameters into particular panes within the information area 302 are defined according to the type of component that is being accessed. Therefore, the content and groupings of information displayed in area 302 for the selected control processor (ZCP703) is exemplary. The "Counters" and "Connection" display modes are depicted, by way of further examples, in FIGS. 4 and 5 described herein below.

The exemplary HMI application 200 GUI depicted in FIG. 3 also includes an accessories pane area 310 that, in contrast to the information pane 302 which provides information for a single component, selectively presents a variety of lists for potentially many components including: messages, alarms, inhibited components, search list, watch list, and a system monitor log. The accessories pane area 310 facilitates presenting a particular type of information across multiple components of the process control system. The types of multi-component information presented in the accessories pane area 310 are described herein below.

A menu bar 312 provides access to a variety of standard WINDOWS-supported actions.

A toolbar 314 described herein below provides direct access to particular functions supported by the GUI of the system management HMI 200. Furthermore, a status bar 316 provides a user with immediate status information regarding the connectivity of a workstation (e.g., "AWSM01 connected") and a most recent system management message— including transient messages received from other subsystems. The various areas of the exemplary GUI for the system management HMI application 200 depicted in FIG. 3 are described further herein below.

The navigation pane 300 displays a collapsible tree (to reduce the quantity of displayed nodes) comprising a set of nodes representing hierarchical physical/logical relationships between various physical components of a process control system. An exemplary process control system/network comprises stations, control processors, field I/O modules and field devices. The process control system/network is graphically presented to users in the form of a tree within the navigation pane 300 by logical domains and/or physically arranged by connection to network switches. The form and content of a hierarchical tree view of the system presented upon the navigation pane is governed by a system configuration definition installed in the database 202 during setup of the system.

The hierarchical tree displayed within the navigation pane 300 is presented in any one of a variety of selectable sorting criteria to suit a current monitoring maintenance task. The sorting criterion selected by a user is thereafter applied at each level of the hierarchy. Particular sorting rules include:

System Monitor Domains sorted alphabetically
Logical (by System Monitor assignment)
Physical (by switch attachment)
Components sorted by name (the default sorting criterion)
Components sorted by type Sorting the Navigation Pane by name order shall be the default.

In an exemplary embodiment the logical view is rendered when a user selects the SMON button 320. In the logical view, the system monitor domain name is displayed at the highest level of a displayed tree. Contained equipment nodes are displayed at lower levels of the navigation tree's hierarchy based upon their logical/functional relationships. For example, a system monitor domain (e.g., SYSMN1) resides at the top level of the hierarchy. Expanding a system monitor domain node reveals a set of devices contained within its domain. The second level of the tree thus includes a combination of connected workstations (e.g., AWSM03) and control processors (e.g., FCP805, ZCP703, etc.). In the case of control processors (e.g., ZCP703), a small block icon under each control station node, bearing the same name, represents the station's Primary FBM, an equipment control block (the PrimaryECB) that manages communications with the attached FBMs. A set of field I/O devices (e.g., FBMs and FCMs) are connected to the Primary FBM node at a next lower level.

Alternatively, when the Switch button 322 is selected, the network switches are displayed at the highest level and the navigation pane 300's switch view depicts network switch components at the highest level and connected stations and devices below. The Switch view shows equipment physically connected to the same MESH network switch device.

With continued reference to the navigation pane 300, the GUI for the system management HMI application 200 includes a variety of features to enhance users' ability to recognize potential problems through prominent display of exceptions (e.g., alarms) by visual indicators at one or more nodes in the displayed tree view. Examples of such indicators include multiple formats such as changing the color of a tag or other graphical representation of a system component to ensure differentiation between normal and abnormal operational states of represented equipment. Examples of differentiation include color, shape (alter or replace previously displayed icon/representation of component), and text.

In addition to graphically representing alarms or other status changes through modifications to a node corresponding to the changed component, the navigation tree functionality also supports indicating an important condition change (e.g., a failed component or warning) in a hidden node by propagating the change status to at least one ancestor of the hidden node in a hierarchical tree. In an exemplary embodiment, such status changes are propagated to the highest level of a displayed navigation tree. The propagation feature is described further herein below with reference to FIGS. 7 and 8. Opening a set of branches under a higher level node reveals the source of the status change at a next lower level. As further levels are opened at each node under exceptional status, the user is guided by further node in alarm state at the next lower level. Examples of exception status include: failure, unacknowledged alarm, inhibited, and non-responsive. Other exception status types are contemplated in alternative embodiments.

Furthermore, the navigation pane 300 supports accessing node-specific actions via context menus. Thus, once a user has identified a node for which an action needs to be taken (e.g., acknowledge an alarm), the user in many cases accesses a utility/operation for taking the desired action by invoking the node's context menu and then selecting one of the functions presented via the context menu.

The toolbar 314 includes a set of controls (e.g., buttons, query fields, icons, etc.) providing access to frequently used functions supported by the HMI application 200. The toolbar 314 area, by way of example, comprises a clock and calendar graphical interface and a field identifying a master timekeeper's station (e.g., AWSM01). A traversed nodes window 317 depicts a set of icons corresponding to a node selection path ending in the currently selected node on the displayed tree in the navigation pane 300 corresponding to the presently displayed information in information area 302. The traversed nodes window graphically depicts a user's navigation path down the displayed tree in the navigation pane 300. A user can select any of the displayed icons to render the corresponding information in the area 302 and can be used as an alternative to the navigation pane 300 to select a component/node of interest.

The toolbar 314 also includes a query box and control supporting a "Go to:" type search function that facilitates locating and selecting a component by name (e.g., Letterbug) in the navigation pane 300's tree view. Rather than provide a list of results, the "Go to:" search function traverses the set of system component information records for a record corresponding to the supplied name. Once the desired component has been located, the associated information for the component is automatically displayed in the information pane 302. The toolbar 314 can be "hidden" to provide additional space for the accessories, navigation and/or component-specific information panes.

The Information pane 302 displays detailed information about a single component represented on the hierarchical tree of the navigation pane 300. In fact, one of the easiest way to access the content for a system component for display within the information pane 302 is by selecting (e.g., double-clicking) that node on the hierarchical tree in the navigation pane 300. Examples of selectable system equipment for which information is displayable in the information pane 302 include: a station, fieldbus module, field device, integrated peripheral device or network switch.

Figure 4:
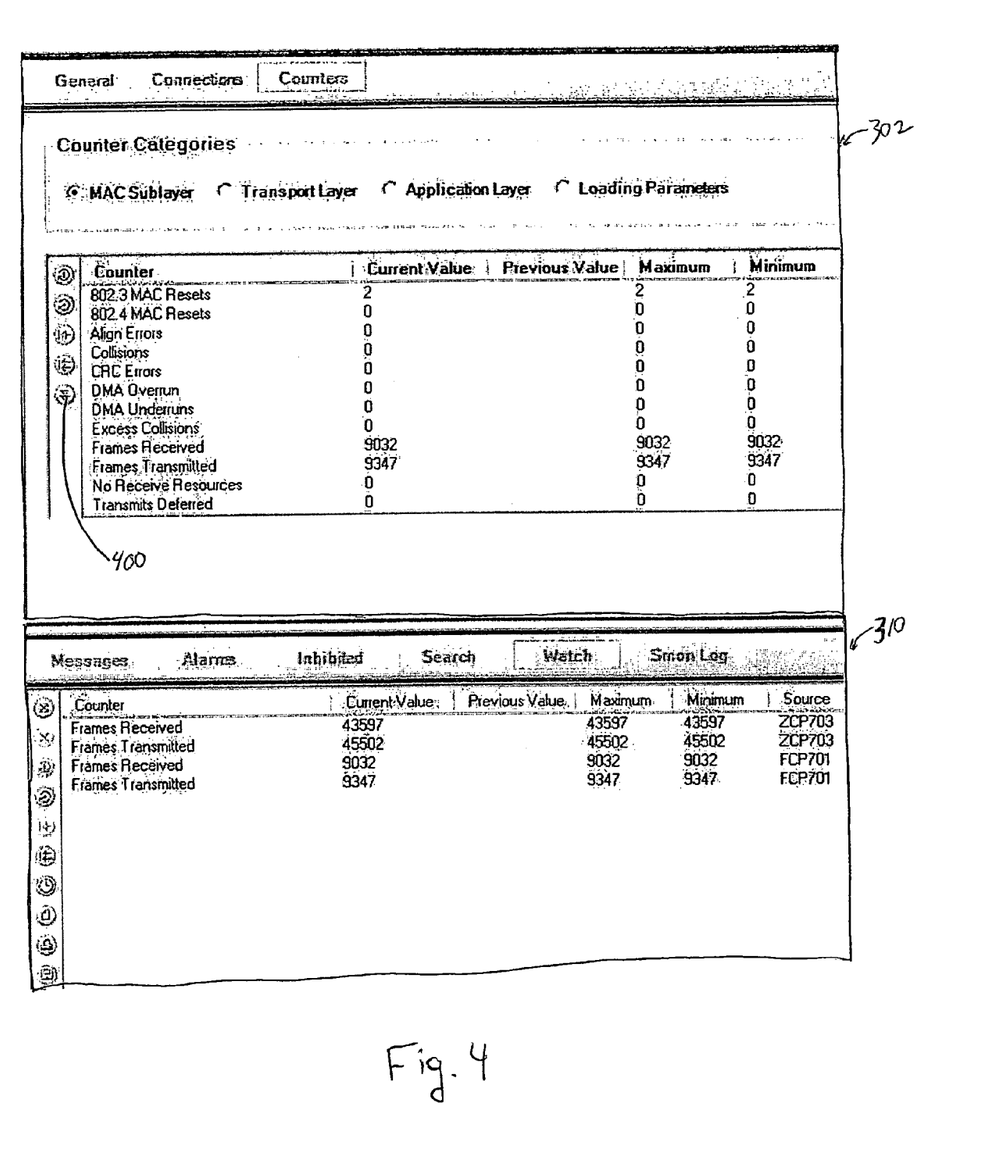
FIG. 4 is an exemplary portion of a system management HMI application GUI for presenting counter diagnostic information.

Furthermore, as noted previously herein above, the potentially large quantities of information associated with a particular selected component displayed within the information area 302 are divided into three general groups, corresponding to the General, Connections and Counters controls 303, to facilitate their display within the confined space of area 302. The "General" information group is described above. Turning to FIG. 4, an exemplary display is presented of the information area 302 while in the "Counters" information group display mode. In the illustrative embodiment a set of counter categories 400 are presented within the information area 302. Each one of the selectable categories (of which potentially multiple ones can be simultaneously selected) corresponds to a particular set of network communications protocol layer-related counters. The counter values are displayed in table format containing, by way of example, columns identifying: a counter name, current value, previous value, lowest value and highest value. These counter information types are exemplary and other types of information for a counter parameter will be presented in alternative embodiments. In an illustrative embodiment the HMI application 200 supports designating the refresh behavior of the counters including: refresh on demand, refresh only some parameters, refresh all or a portion of the displayed parameters on a periodic basis. A reset control will also resetting all or individual ones of the counters.

Figure 5:
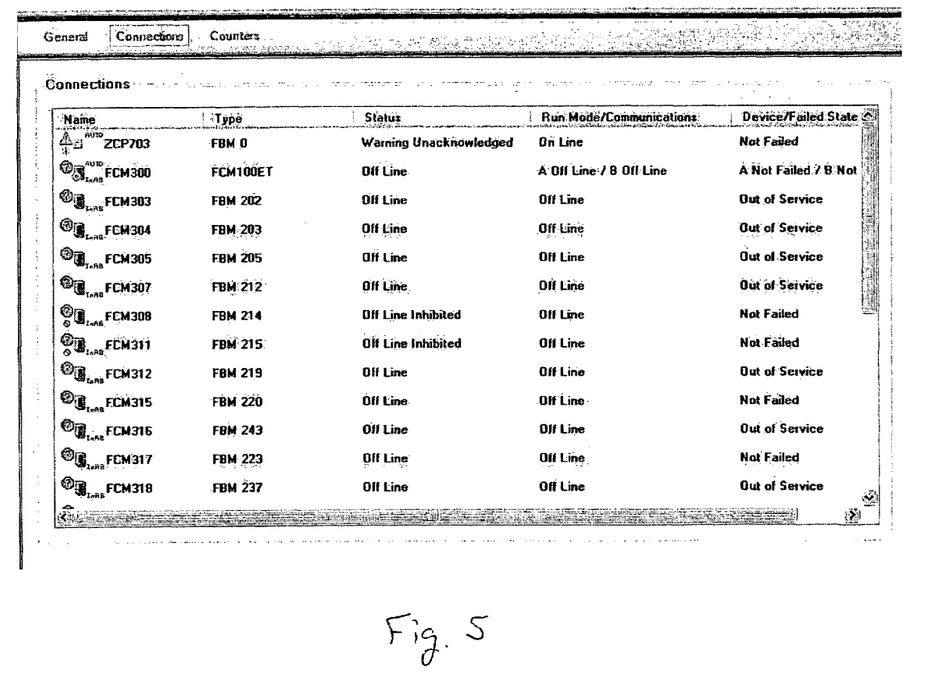
FIG. 5 is an exemplary connections information pane displaying component-specific connection information showing connectivity to a network segment.

Turning briefly to FIG. 5, an exemplary display is presented of the information area 302 while in the "Connections" information group display mode. In the illustrative embodiment a set of connections between the selected component and other system components are identified by naming the connected entity in a "Name" column. Other columns display for each connection the following: a connection type, a current status, an operating mode (e.g., online/offline), and a failed state. The list of connection-related information is exemplary. Other connection parameters are provided in alternative embodiments.

Having described the component-specific information area 302, attention is again directed to the accessories pane 310 to describe an exemplary set of types of information presented within the accessories pane area 310 for multiple system components. Referring to FIG. 3, messages (e.g., informational and alarm) relating to any of various system components are generated by the process control system management internal components 206. The messages are forwarded to the system management HMI application 200 and displayed in the status bar 316. However, a subsequent message overwrites a previous message. In an exemplary embodiment, the list of messages is archived until conditionally (e.g., on a per-session basis, until cleared by a user, when a circular buffer is filled). When a user selects a "Messages" control at the top of the accessories pane 310, the list of messages (potentially filtered) is presented. In addition to the message itself, each message list entry will include a timestamp.

An "Alarms" control within the accessories pane area 310 is used to invoke a utility that enables a user to review a list of system alarms. With reference again to FIG. 3, the accessories pane area 310, while operating in the watch mode, displays a list of alarm messages from multiple system components. In the illustrative embodiment, the alarms graphical user interface includes a set of columns for specifying: an acknowledge status, an index number, a data/time stamp, a source station of the alarm message, a path of a component from which the alarm arose (used to propagate an alarm to ancestors on the tree within the navigation pane 300), and an alarm message. The user interface supports selecting and acknowledging a single alarm, all pending alarms, and particular types of alarms (e.g., cable connection alarms).

An "Inhibited" control within the accessories pane area 310 is used to invoke a utility for listing all components for which alarms are inhibited. Furthermore, the accessories pane area 310, while presenting a user interface corresponding to an Inhibited mode, will support a user selecting and enabling particular listed alarms.

Figure 6:
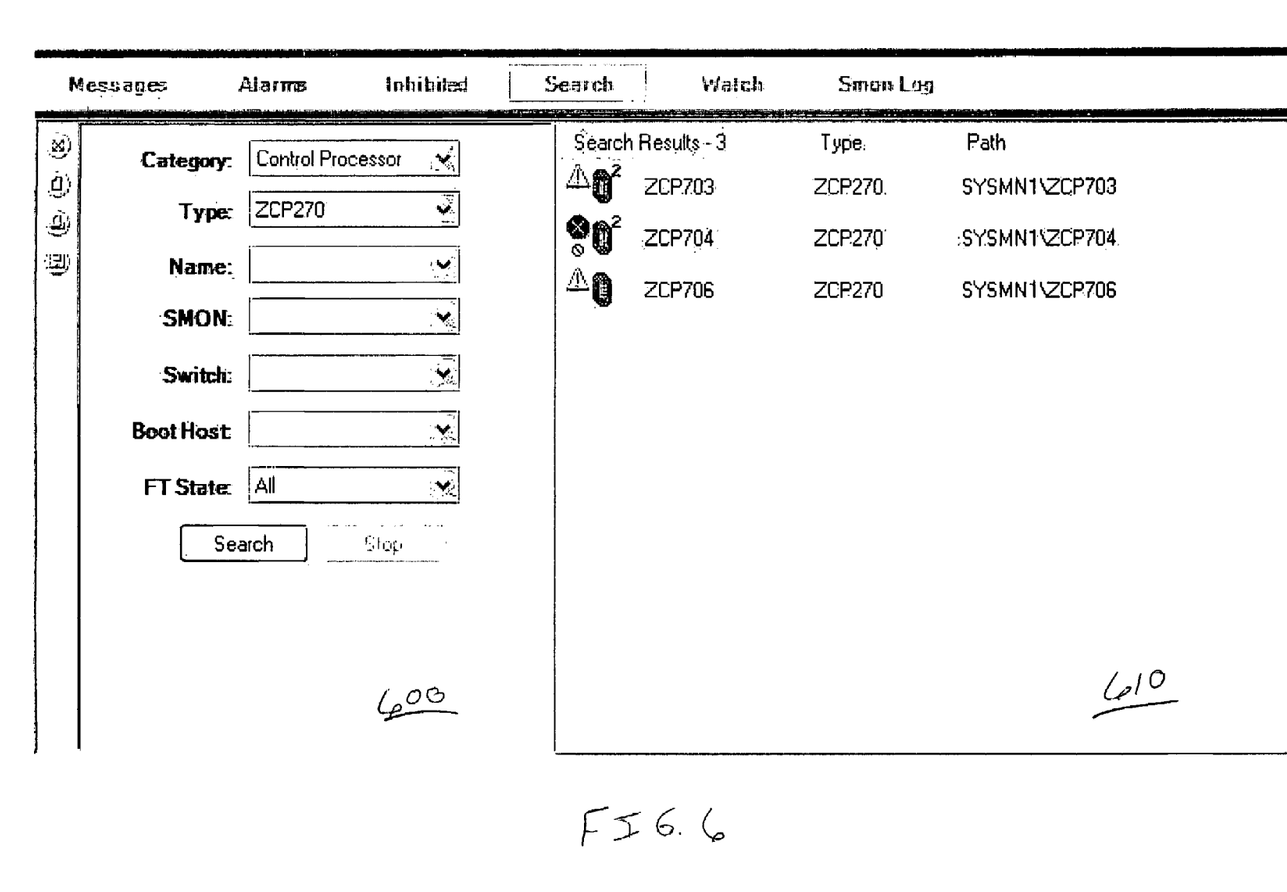
FIG. 6 is an exemplary accessories pane including a search user interface and results area enabling selection of particular search result entries for displaying system equipment specific information.

A "Search" control supported by the accessories pane area 310 of the HMI application 200 provides access to a utility that enables a user to search for a component based on a piece of configuration information, then navigate to that component's information. Referring to FIG. 6, an exemplary graphical user interface is provided that is generated within the accessories pane area 310 when a user selects the "Search" control. The search utility interface presents a set of searchable categories in a search definition pane 600 that enables a user to specify a search string or strings that will govern a subsequent search of system component records maintained within the system management configuration database 202. While the illustrative embodiment limits searching to information in the configuration database, alternative embodiments include searching dynamic, runtime databases.

The exemplary search utility, as shown in FIG. 6, supports a variety of search parameters for components including: category (e.g., control processor, FBM, etc.), type (e.g., ZCP, FCP, etc.), name, associated system monitor, associated switch, boot host, and FT (fault tolerant) state. Furthermore, in fields where a text string is provided, the search function supports wildcard designators. When a user completes a search definition, the "Search" button is selected to submit the query for processing. The search criterion defined by a user is processed by a database of system component information. A user can stop the query by selecting the "Stop" button.

A results field 610 supports rendering a set of results provided by the database meeting a specified search criterion. The results field 610 returns a list of matched component records. In the illustrative embodiment the returned results include a component name, visual (e.g., icon-based) current status indicators, component type, and a path of the component. The path is passed to records access functionality associated with the navigation pane 300 (mimicking a user's selection of a node within the navigation pane 300) to automatically access corresponding information for a selected component upon a user's selection of an entry in the results field 610. The contents of the selected component are thereafter displayed within the information pane 302.

A "Watch" control within the accessories pane area 310 is used to invoke a utility that enables a user to observe counters supported by multiple sources of counter data, including components running on multiple distinct stations. With reference again to FIG. 4 the accessories pane area 310, while operating in the watch mode, displays a set of user-designated watched counters for a set of distinct components. A watched counter within the accessories pane area 310 is designated by first selecting a counter listed within the information pane 302. The selected counter is then added to the list of watched counters displayed in the accessories pane 310 in response to the user selecting a watch button 400 within the accessories pane 310. The HMI application will continue to track the selected counter even after another device is selected from the navigation pane 300 to display the new components' counters. The types of counter information displayed in the information area 302 and in the accessories pane area 310 are dependent upon component type and will vary in accordance with alternative embodiments of the system management HMI application 200. With regard to refreshing counter values displayed in the accessories pane 310, the exemplary embodiment supports a variety of refresh modes/commands including read on demand and periodic update modes. The pane area 310, while operating in the "Watch" mode, displays the following information for each designated counter: counter name, current value, maximum value, minimum value, and source name. Furthermore, in an alternative embodiment, the Watch mode of the accessories pane area 310 supports setting threshold limits on counters and including a visual indication on the watch control (e.g., the button/tab flashes, changes color, etc.) on the user interface.

A "Smon Log" control within the accessories pane area 310 is used to invoke a utility that enables a user to observe and clear contents of a system monitor's log file.

Figure 7:
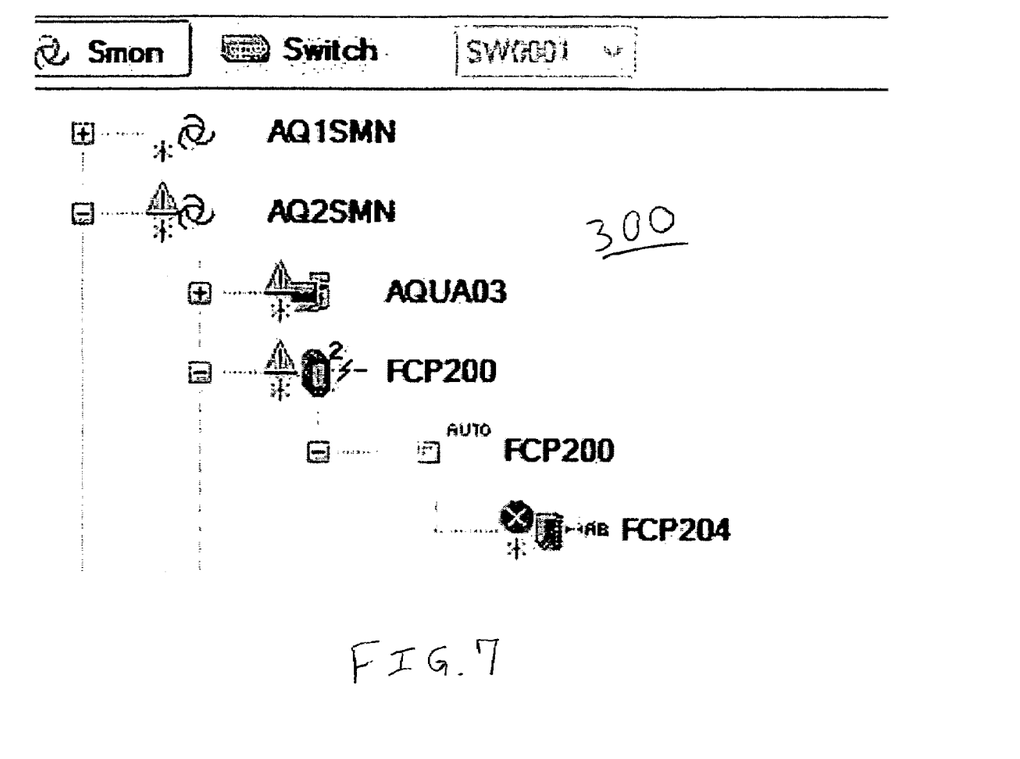
FIG. 7 is an exemplary navigation pane portion including a set of equipment icons and associated status indicators.

Turning to FIG. 7, a further illustrative example of an enhanced hierarchical component tree displayed within the navigation pane 300 is provided in an enlarged form to facilitate describing the HMI application 200's supplementation of the component tree nodes to include a variety of status indicators as well as further illustrate the ability to propagate an exception to parent nodes on a navigation tree. A legend window 800 is provided in FIG. 8 that provides short explanations of each of the different types of status indicators supported on the tree view of the components in the navigation pane 300. The legend window 800 is rendered upon user request (via a help menu item on the Menu bar 312) to aid interpreting the various status indicators incorporated into the display of components within the navigation pane.

Figure 8:
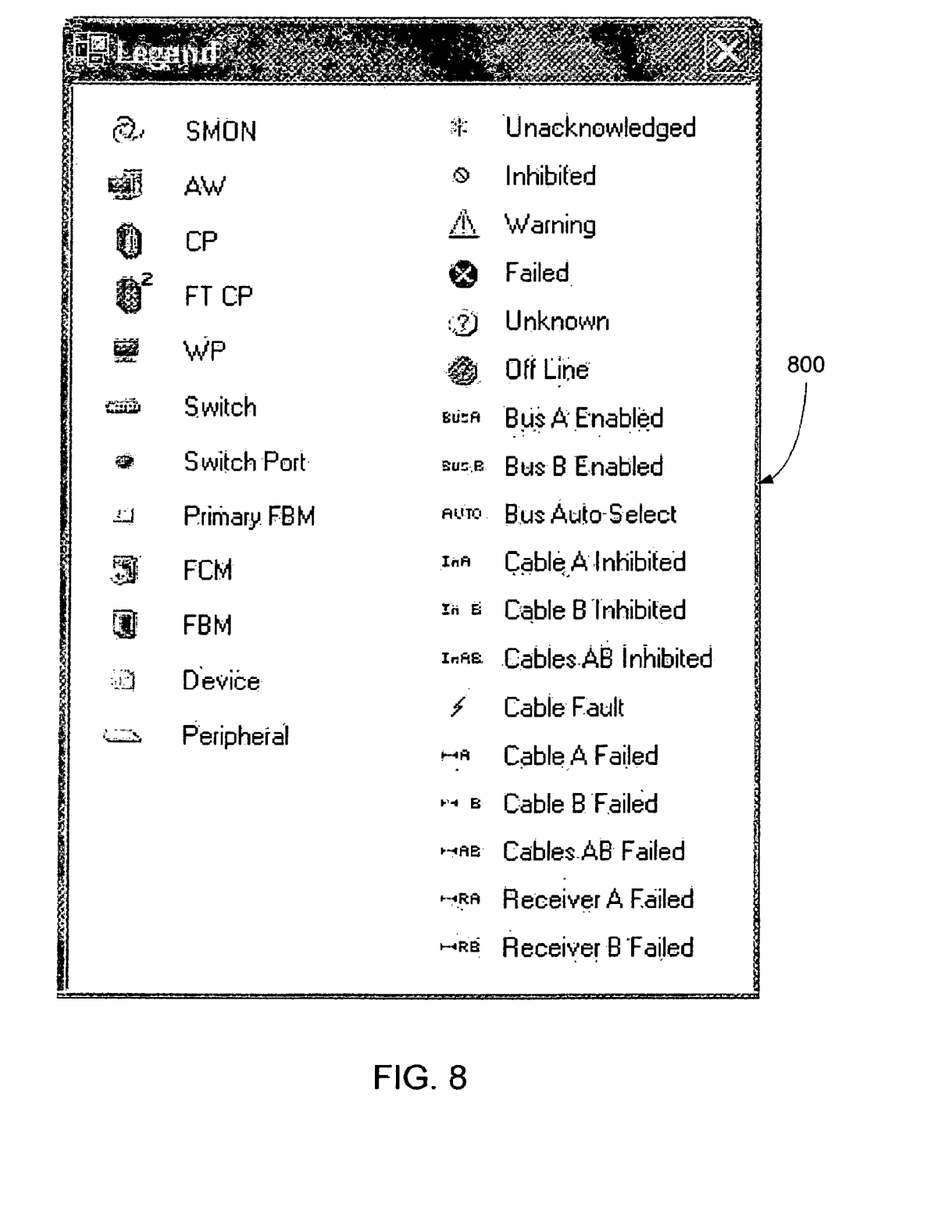
FIG. 8 is a legend identifying a set of equipment icons and status indicators.

As a tutorial on the various status indicators supported in an illustrative embodiment, the meaning of each of the symbols in FIG. 8 will be described prior to describing the illustrative navigation tree portion depicted in FIG. 7. In the illustrative embodiment, the legend 800 defines icon symbols that convey unique status/alarm conditions based upon symbolic graphics, text and/or colors.

First, a set of equipment icons are depicted on the left column of the legend window 800. The equipment icons are assigned on a one-per-node basis on the navigation tree.

A SMON icon represents a system monitor domain which corresponds to a logical association of monitored system equipment.

An AW icon represents a workstation. Workstations are at the second level of the hierarchical navigation pane tree.

A WP icon represents a workstation. Workstations are at the second level of the hierarchical navigation pane tree. The illustrative example includes two types of control processor/station icons.

A CP icon corresponds to non-redundant control processor arrangement.

An FT CP icon, including a small superscript "2" indicates a fault tolerant control processor.

A Switch icon represents an Ethernet switch in a "switch" view of the navigation tree hierarchy.

A Switch port icon is not used in the tree view. However, it is used to represent a switch in the information pane when a switch is selected by a user.

A Primary FBM icon, found under each control station in the tree, represents the primary FBM for the station, an equipment control block that manages communications with the attached FBMs. An auto, SwA, or SwB modifier on the right side of the icon indicates the configuration of the component in a fault tolerant communications bus arrangement.

An FCM icon, represents a fieldbus communications module which connect control processors to fieldbus modules in fault tolerant bus configurations. The appearance of the FCM icon is modified to indicate which bus is being used.

An FBM icon represents fieldbus modules which connect to either a Primary FBM or an FCM. Labels to the right of the FBM icon indicate communications status between the FBM and its host A device icon is used to represent an attached intelligent field device.

A Peripheral icon represents computer peripherals such as printers and annunciator panels.

Having described the icons representing components in a process control system, a set of status indicators, used to indicate the status of presented components, are depicted on the right column of the legend window 800. In general the system management HMI application 200s GUI indicates equipment health status by attaching symbols to the upper left corner of the equipment's icon and, if Enable blinking is checked in the configuration dialog box for the particular piece of equipment, then color-coding of the equipment name. Similarly, the status of alarms associated with particular equipment is indicated by attaching symbols to the lower left corner of the equipment's icon. The status indication scheme described herein is used in the Navigation pane 300, the traversed nodes window 317, the Connections display mode the information pane 302, and the results table in the accessories pane 310's Search mode display. The description of the status indicators below shows how symbols, text, blinking, and color-coding are used to visually convey alarm states and indicate equipment health status in association with icons representing specific system equipment. As noted above, exception and alarm states are propagated up a tree's hierarchy in the navigation pane 300. Therefore, an exception status can indicate an exception in either a node displaying an exception status indicator or one of its potentially hidden children. Normal condition is represented by an equipment icon with none of the exception status indicators described herein below.

Regarding Alarm Status:

An Unacknowledged icon indicates that there is an unacknowledged alarm at either the represented equipment of connected equipment attached at a lower level in the navigation pane 300's tree. The name tag for the equipment will flash if blinking is enabled. Unacknowledged alarm status is propagated from its source equipment to all ancestor nodes.

An Inhibited icon indicates that alarms are inhibited on the specific device. Inhibited alarm status is not propagated to other nodes on a navigation tree.

Regarding Equipment Health Status:

A Warning icon indicates that there is at least one child device in an exception state attached to the equipment represented in the present icon.

A Failed icon indicates that the equipment represented by the particular node has failed. The Failure status of equipment is propagated to and displayed adjacent to a parent equipment (e.g., a control processor) icon in the form of a Warning Icon. An equipment failure at any level is propagated and displayed as a Failure icon adjacent to the corresponding System Monitor (SMON) icon.

An Unknown icon indicates that the present status of the specific equipment associated with the node is presently unknown.

An Offline icon indicates that the equipment represented by the particular node is presently offline.

A number of connectivity status indicators are supported for representing the status of communications in redundant, fault-tolerant network link arrangements. They include:

A Bus A (or B) Enabled icon indicates an operator specified bus selection.

A Bus Auto Select icon indicates an automatic bus selection status/mode.

A Cable A (or B or AB) Inhibited icon indicates whether the communication is forced to only one of the two possible communication pathways by inhibiting communication on the second bus.

A Cable Fault icon indicates a cable fault.

A Cable A (or B or AB) Failed icon indicates a specific one or both cables failed in a fault tolerant cable configuration.

A Receiver A (or B) Failed icon indicates that one of the receivers on a piece of equipment's network interface has malfunctioned.

The system management HMI application 200 GUI uses a variety of symbols and text to indicate system equipment health status changes. In addition to marking the problematic equipment, the equipment health status change is propagated to parent equipment and the system monitor node with which the problematic is associated. Turning to FIG. 7, an exemplary portion of the navigation pane 300 is provided as an example of how the system equipment monitor displays propagated status such that a fault at a lower level of the hierarchy will be visually displayed even if the source of the fault is not exposed in the navigation pane 300.

In the particular example, the tree diagram shows propagation of the faults from the lowest equipment levels of the system to the highest level (the logical system monitor domain AQ2SMN) of the system. Rules for how fault indicators are propagated are dependent on the equipment and are not part of the logic of the HMI application 200 disclosed herein. The HMI application 200 gathers up the fault indicator information and displays the appropriate indication to aid the user in navigating to a problem equipment component where action may be taken. Thus, the HMI application 200 leverages existing infrastructure that propagates alarms and other fault indications within the system and reports the information in the form of well-defined status icons displayed adjacent an appropriate node of the system status tree within the navigation pane 300.

With continued reference to FIG. 7, working down from the System Monitor Domain level (AQ2SMN) a circle with an "X" indicator shows that a contained equipment is faulted. The asterisk (*) indicates the fault has not been acknowledged. System monitors cannot fail themselves as they are logical groups of equipment. However, a system monitor node (the highest level of the navigation tree) indicator reflects the most severe status of a contained device.

At the station level two faults are shown, the first on a Control Processor station shows an unacknowledged warning (FCP200) to indicate that an attached peripheral or child equipment has failed. The red failed symbol is not shown on the Control Processor as that would indicate the station itself was failed. Below the station (FCP200), one of a set of attached Field Bus Modules is failed (FCP204). If a device contained by a fieldbus module was failed then a red failed indicator is displayed on the device and a yellow warning indicator would be shown on the Field Bus Module. An unacknowledged fault of an attached device is indicated on a workstation (AQUA03). It shows the yellow warning indicator and an asterisk. As shown in the exemplary case, the navigation tree aspect of the system monitor HMI application 200 provides enhanced notification capabilities through the use of graphical status representations (e.g., icons) and through display of propagated status at the highest (system monitor domain) level of the navigation pane.

The structures, techniques, user interfaces and associated benefits discussed above are merely exemplary embodiments of the invention carried out by software executed upon a computer and stored on computer readable media in the form of computer executable instructions. In view of the many possible embodiments to which the principles of this invention may be applied, it should be recognized that the embodiments described herein with respect to the drawing figures are meant to be illustrative only and should not be taken as limiting the scope of invention. The illustrated embodiments can be modified in arrangement and detail without departing from the spirit of the invention. Moreover, those of skill in the art will recognize that the disclosed principles are not limited to any particular local area network protocols and/or topologies. Therefore, the invention as described herein contemplates all such embodiments as may come within the scope of the following claims and equivalents thereof.

What is claimed is:

1. A workstation including a computer-readable medium comprising computer-executable instructions for presenting a system management human machine interface (HMI) including a multi-paned human-machine interface window on a display, the workstation executing the computer-executable instructions to simultaneously present, within the multi-paned human-machine interface window:
   a navigation pane graphically displaying a hierarchical tree including nodes corresponding to control system equipment, and
   a component-specific information area providing detailed information corresponding to a selected node on the navigation pane hierarchical tree wherein the detailed information includes diagnostic information; and
   wherein the hierarchical tree includes graphical status indicators displayed proximate equipment identifiers for equipment nodes with which the individual graphical status indicators are associated.

2. The workstation of claim 1 wherein the equipment identifiers comprise equipment icons.

3. The workstation of claim 2 wherein the equipment icons are displayed in accordance with a standardized set of equipment icons and equipment types incorporated into an icon legend, displayable on the workstation, associated with the hierarchical tree.

4. The workstation of claim 1 wherein the graphical status indicators comprise status icons.

5. The workstation of claim 4 wherein the status icons are displayed in accordance with a standardized set of status icons and equipment statuses incorporated into an icon legend, displayable on the workstation, associated with the hierarchical tree.

6. The workstation of claim 1 wherein the hierarchical tree includes a logical monitor node display element at a highest level of the hierarchical tree, a graphical status indicator is presented proximate the logical monitor node display element, and wherein status of lower nodes on the hierarchical tree propagates from the lower nodes up to the status indicator for the logical monitor node display element.

7. The workstation of claim 1 wherein one of the graphical status indicators corresponds to a failed status.

8. The workstation of claim 1 wherein one of the graphical status indicators corresponds to an unacknowledged status.

9. The workstation of claim 1 wherein one of the graphical status indicators corresponds to a warning status.

10. The workstation of claim 1 wherein one of the graphical status indicators indicates an unknown status.

11. The workstation of claim 1 wherein one of the graphical status indicators indicates an offline status.

12. The workstation of claim 1 wherein the component-specific information area comprises multiple display modes corresponding to particular groups of component-specific information displayed.

13. The workstation of claim 12 wherein the multiple display modes include a general information mode wherein the component-specific information area displays detailed status and configuration information for a selected piece of equipment.

14. The workstation of claim 12 wherein the multiple display modes include a counters mode wherein the component-specific information area displays, for each one of a set selectable network counter categories, network communications protocol layer-related counter value sets.

15. The workstation of claim 12 wherein the multiple display modes include a connections mode wherein the component-specific information area displays a set of connections between a system component corresponding to the selected node and other system components and the status of the connections.

16. The workstation of claim 1 further comprising computer-executable instructions for providing a process control system equipment data handler that communicates with system management data sources to support the presentation of information within the component-specific information area.

17. A computer-readable medium comprising computer-executable instructions for presenting, on a workstation, a system management human machine interface (HMI) including a multi-paned human-machine interface window on a display, the computer-executable instructions facilitating performing on the workstation the following steps:
   presenting a navigation pane graphically displaying a hierarchical tree including nodes corresponding to control system equipment; and
   presenting a component-specific information area providing detailed information corresponding to a selected node on the navigation pane hierarchical tree wherein the detailed information includes diagnostic information;
   wherein the navigation pane and component-specific information area are simultaneously presented, by the workstation, within the multi-paned human-machine interface window, and
   wherein the hierarchical tree includes graphical status indicators displayed proximate equipment identifiers for equipment nodes with which the individual graphical status indicators are associated.

18. The computer-readable medium of claim 17 wherein the hierarchical tree includes a logical monitor node display element at a highest level of the hierarchical tree, a graphical status indicator is presented proximate the logical monitor node display element, and wherein status of lower nodes on the hierarchical tree propagates from the lower nodes up to the graphical status indicator for the logical monitor node display element.

19. A method for presenting, on a workstation display, a system management human machine interface (HMI) including a multi-paned human-machine interface window, the method comprising the steps of:
   presenting a navigation pane graphically displaying a hierarchical tree including nodes corresponding to control system equipment; and
   presenting a component-specific information area providing detailed information corresponding to a selected node on the navigation pane hierarchical tree wherein the detailed information includes diagnostic information;

wherein the navigation pane and component-specific information area are simultaneously presented, by the workstation, within the multi-paned human-machine interface window, and wherein the hierarchical tree includes graphical status indicators displayed proximate equipment identifiers for equipment nodes with which the individual graphical status indicators are associated.

20. The method of claim 19 wherein the hierarchical tree includes a logical monitor node display element at a highest level of the hierarchical tree, a graphical status indicator is presented proximate the logical monitor node display element, and wherein status of lower nodes on the hierarchical tree propagates from the lower nodes up to the status indicator for the logical monitor node display element.

\* \* \* \* \*